United States Patent [19]

Machado et al.

[11] Patent Number: 5,132,360
[45] Date of Patent: Jul. 21, 1992

[54] POLYKETONE POLYMER BLENDS

[75] Inventors: Joseph M. Machado, Richmond; William P. Gergen, Houston, both of Tex.

[73] Assignee: Shell Oil Company, Houston, Tex.

[21] Appl. No.: 529,818

[22] Filed: May 29, 1990

[51] Int. Cl.$^5$ .................... C08L 51/04; C08L 73/00; C08G 67/02
[52] U.S. Cl. .................... 525/64; 525/185; 525/539; 525/902
[58] Field of Search .................... 525/64, 539, 185, 902

[56] References Cited

U.S. PATENT DOCUMENTS

| | | | |
|---|---|---|---|
| 2,495,286 | 1/1950 | Brubaker | 260/63 |
| 3,668,274 | 6/1972 | Owens et al. | 260/857 G |
| 3,694,412 | 9/1972 | Nozaki | 260/63 |
| 3,793,402 | 2/1974 | Owens | 260/876 R |
| 3,796,771 | 3/1974 | Owens et al. | 260/857 G |
| 3,843,753 | 10/1974 | Owens | 260/876 R |
| 3,984,497 | 10/1976 | Owens et al. | 260/879 |
| 4,086,300 | 4/1978 | Owens et al. | 260/885 |
| 4,148,846 | 4/1979 | Owens et al. | 260/885 |
| 4,463,131 | 7/1984 | Grandzol et al. | 525/76 |
| 4,783,494 | 11/1988 | Allen | 525/67 |
| 4,814,378 | 3/1989 | Lutz | 525/55 |
| 4,843,144 | 3/1989 | Van Broekhoven et al. | 528/392 |
| 4,859,738 | 8/1989 | Farah et al. | 525/67 |
| 4,866,128 | 9/1989 | Gergen et al. | 525/93 |
| 4,870,133 | 9/1989 | Lutz et al. | 525/539 |
| 4,874,819 | 10/1989 | George et al. | 525/185 |
| 4,880,903 | 11/1989 | Van Broekhoven et al. | 528/392 |
| 4,894,423 | 1/1990 | Farah et al. | 525/67 |
| 4,900,789 | 2/1990 | Gergen | 525/185 |

FOREIGN PATENT DOCUMENTS

| | | |
|---|---|---|
| 066382 | 9/1982 | European Pat. Off. . |
| 265142 | 7/1988 | European Pat. Off. . |
| 1081304 | 3/1967 | United Kingdom . |
| 2194541 | 2/1988 | United Kingdom . |

*Primary Examiner*—Ana L. Carrillo
*Assistant Examiner*—Thomas Hamilton, III
*Attorney, Agent, or Firm*—Denise Y. Wolfs

[57] ABSTRACT

Improved compositions comprise polymer blends of a linear alternating polymer of carbon monoxide and at least one ethylenically unsaturated hydrocarbon with an acrylic shell-core modifier, and, optionally, an acidic polymer containing moieties of an α-olefin and an α,β-ethylenically unsaturated carboxylic acid. The blends demonstrate improved toughness at both ambient and low temperatures.

20 Claims, No Drawings

POLYKETONE POLYMER BLENDS

FIELD OF THE INVENTION

This invention relates to an improved polymer blend comprising a linear alternating polymer of carbon monoxide and at least one ethylenically unsaturated hydrocarbon. More particularly, the invention relates to a blend of (1) the linear alternating polymer, (2) an acrylic shell-core modifier, and optionally, (3) an acidic polymer containing moieties of an α-olefin and an α,β-ethylenically unsaturated carboxylic acid.

BACKGROUND OF THE INVENTION

The class of polymers of carbon monoxide and olefins has been known for some time. U.S. Pat. No. 2,495,286 (Brubaker) discloses such polymers of relatively low carbon monoxide content in the presence of free radical initiators, e.g., peroxy compounds. G.B. 1,081,304 discloses similar polymers of higher carbon monoxide content in the presence of alkylphosphine complexes of palladium compounds as catalyst. U.S. Pat. No. 3,694,412 (Nozaki) extended the reaction to produce linear alternating polymers in the presence of arylphosphine complexes of palladium moieties and certain inert solvents.

More recently, the class of linear alternating polymers of carbon monoxide and at least one ethylenically unsaturated hydrocarbon, now becoming known as polyketones or polyketone polymers, has become of greater interest. U.S. Pat. No. 4,880,903 (VanBroekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt or nickel, the anion of a strong non-hydrohalogenic acid and a bidentate ligand of phosphorus, arsenic or antimony. U.S. Pat. No. 4,843,144 (VanBroekhoven et al.) discloses a process for preparing polymers of carbon monoxide and at least one ethylenically unsaturated hydrocarbon using the preferred catalyst comprising a compound of palladium, the anion of a non-hydrohalogenic acid having a pKa of below about 6 and a bidentate ligand of phosphorus.

The resulting polymers are relatively high molecular weight materials having established utility as premium thermoplastics in the production of shaped articles, such as containers for food and drink and parts for the automotive industry, which are produced by processing the polyketone polymer according to well known methods. For some particular applications however, it has been found to be desirable to have properties which are somewhat different from those of the polyketone polymer. It would be of advantage to retain the more desirable properties of the polyketone polymer and yet improve other properties. These advantages are often realized through the provision of a polymer blend.

SUMMARY OF THE INVENTION

The present invention provides blends of a linear alternating polymer of carbon monoxide and at least one ethylenically unsaturated hydrocarbon with certain other polymeric materials. More particularly, the invention provides blends of (1) the linear alternating polymer with (2) an acrylic shell-core modifier, and, optionally, (3) an acidic polymer containing moieties of an α-olefin and an α,β-ethylenically unsaturated carboxylic acid, optionally containing a third polymerizable monomer and wherein, optionally, a portion of the carboxylic acid groups are neutralized with non-alkali metal. The blends of the invention exhibit improved toughness at both ambient and low temperatures.

DESCRIPTION OF THE INVENTION

The polyketone polymers of the blends of the invention are of a linear alternating structure and contain substantially one molecule of carbon monoxide for each molecule of unsaturated hydrocarbon. Suitable ethylenically unsaturated hydrocarbons for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethyleneic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propylene.

When the preferred polyketone terpolymers are employed as the major polymeric component of the blends of the invention, there will be within the terpolymer at least about 2 units incorporating a moiety of ethylene for each unit incorporating a moiety of the second hydrocarbon. Preferably, there will be from about 10 units to about 100 units incorporating a moiety of the second hydrocarbon. The polymer chain of the preferred polyketone polymers is therefore represented by the repeating formula

wherein G is the moiety of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the —CO—(CH$_2$-CH$_2$)— units and the —CO—(G)— units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent so that the polymers are fairly represented by the formula for the polymer chain as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

A preferred method for the production of the polyketone polymers is illustrated by U.S. Pat. No. 4,843,144. The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The scope of the polymerization is extensive but, without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated as by cooling the reactor and contents and releasing the pressure. The polyketone polymer is typically obtained as a product substantially insoluble in the reaction diluent and the product is recovered by conventional methods such as filtration or decantation. The polyketone polymer is used as recovered or the polymer is purified as by contact with a solvent or extraction agent which is selective for catalyst residues.

A second component of the blends of the invention is an acrylic shell-core modifier, having a first phase of an elastomer and subsequent phases which are, at least in part, chemically linked to the elastomer core. The subsequent phases may be elastomeric or rigid thermoplastic or a combination of the two, but the final phase is a rigid thermoplastic.

The acrylic shell-core modifier comprises:
A) about 50 to 90 wt % of a first elastomeric phase having a glass transition temperature of less than about 25° C.; and
B) about 10 to 50 wt % of a final rigid phase, having a glass transition temperature (Tg) of greater than about 50° C. and polymerized from monomers selected from the group consisting of alkyl methacrylates, styrenes, acrylonitrile, methacrylonitrile and olefins.

The elastomer phase of the shell-core modifier is an interpolymer polymerized from 50 to 99.9 wt % monomers selected from the group consisting of alkyl acrylates, wherein the alkyl group contains 1 to 15 carbon atoms, and butadiene or substituted butadiene; 0 to 40 wt % of other ethylenically unsaturated monomers; 0 to 5 wt % of at least one polyunsaturated crosslinking monomer; and 0 to 5 wt % of a graft-linking monomer. The elastomer may also be a polyurethane, polyether, polyethylene and other elastomers well known in the art which can be dispersed in a medium such that subsequent phases may be added. The preferred elastomer content of the shell-core modifier is 50 to 90%, most preferred is 60 to 80%.

Preferred elastomers have a Tg less than 25° C., and more preferred are those elastomers having a Tg less than −25° C. The Tg is based on the elastomeric portion of the modifier only, not including any subsequent phases or other polymers attached physically or chemically onto or into the particles of the elastomer. The preferred elastomers include acrylic elastomers wherein the interpolymer comprises 50 to 90 wt % alkyl acrylate monomers, wherein the alkyl group preferably contains 1 to 8 carbon atoms and most preferably 2 to 8 carbon atoms; 0 to 20 wt % other acrylic monomers; 5 to 20 wt % other ethylenically unsaturated monomers; 0.1 to 1.0 wt % of polyethylenically unsaturated crosslinking monomer; and 0.1 to 1.0 wt % of graft-linking monomer. Suitable other ethylenically unsaturated monomers include styrene, α-methylstyrene, vinyl and vinylidene halides, vinyl ethers, amides, esters, and the like.

The shell-core modifier is ordinarily and preferably prepared by emulsion polymerization of the elastomer as a discrete phase from a monomer mix of at least about 50 weight percent alkyl acrylate, butadiene or substituted butadiene and one or more of polyethenically unsaturated cross-linking monomers and graft-linking monomers. Upon completion of the polymerization of the elastomeric phase, i.e., substantial exhaustion of the monomers in the initial polymerization mix, the subsequent phases are then added in such a fashion that substantially all the subsequent stages are formed at the surface of the previous stage. The attachment of the subsequent stages to the elastomeric phase may be physical or chemical and includes graft copolymerization.

Suitable polyunsaturated monomers capable of cross-linking the elastomer include polyacrylates and polymethacrylates, polyacrylic and polymethacrylic esters of polyols, divinyl and trivinyl benzene, and vinyl acrylate and methacrylate. Other monomers capable of ionic and coordinate cross-linking include acid groups and organic and inorganic bases and other electron-donating groups coordinated with suitable electrophilic agents.

The graft-linking monomers are similar to the cross-linking monomers, but where the cross-linking monomers have a plurality of addition polymerizable unsaturated groups, each of which participate in the polymerization reaction at about the same rate as one another and as the primary monomers, the graft-linking monomers are compounds having two or more addition polymerizable unsaturated reactive groups which participate in the polymerization reaction at substantially different rates. It is preferred to include compounds where at least one reactive group polymerizes at about the same rate, or slightly slower than the other monomers The differential polymerization rates result in a residual level of unsaturation in the elastomeric phase, particularly during the latter stages of polymerization and, consequently, at or near the surface of the elastomer particles. When the rigid thermoplastic phase is subsequently polymerized at the surface of the elastomer, the residual unsaturated additional polymerizable reactive groups contributed by the graft-linking monomer participate in the subsequent reaction so that at least a portion of the following stage or stages, particularly the rigid phase, is chemically attached to the surface of the elastomer.

The outer phase of the acrylic shell-core modifier is comprised of a rigid thermoplastic. The monomers used for the rigid thermoplastic portion include 50 to 99 wt % of alkyl methacrylate, styrene, α-methylstyrene, halostyrene, acrylonitrile, methacrylonitrile, and olefins which polymerize to give polymers having a Tg greater than about 20° C., preferably greater than 50° C. The rigid thermoplastic portion includes homopolymers or copolymers of alkyl methacrylates wherein the alkyl group contains 1 to 15, preferably 1 to 8 carbon atoms. The rigid thermoplastic phase may contain 0 to 49 wt % of one or more acrylic comonomers, such as other alkyl and aryl methacrylates, alkyl and aryl acrylates, and substituted alkyl and aryl methacrylates. Also, the rigid thermoplastic phase may contain 0 to 40 wt % of another copolymerizable ethylenically unsaturated monomer including vinyl esters, vinyl ethers, vinyl amides, vinyl ketones, vinyl halides, vinylidene halides and olefins.

Typical of the monomers which may be used to prepare the hard phase are esters of acrylic and methacrylic acid such as methyl, ethyl, n-propyl, isopropyl, n-butyl, isobutyl, 2-ethylhexyl, stearyl cyclohexyl, isobornyl, bornyl, fenchyl, norbornyl, adamantyl, benzyl, phenyl and the like. Preferred are those alkyl esters of methacrylic and acrylic acids wherein the alkyl group contains 1 to 4 carbon atoms. The preferred cycloalkyl esters of methacrylic and acrylic acids have cycloalkyl groups containing 4 to 14 carbon atoms.

By control of the polymerization variables, it is possible to control the particle size of the elastomer in the fashion well known to the art. The particle size is not critical to the present invention, and can range from as low as about 0.05 micron or even less, up to as large as about 0.3 micron or more.

The precise percentage of the acrylic shell-core modifier to be employed in the blends of the invention is not critical. Compositions containing from about 1 wt % up to about 45 wt %, based on total blend, of the toughened blend component are believed to be satisfactory, with 10% to 30 wt % being preferred, and 15 wt % to 25 wt % being most preferred.

Acrylic shell-core modifiers of the type described in U.S. Pat. No. 3,984,497, incorporated herein by reference, are particularly useful in the subject invention. A polymethylmethacrylate/butadiene-styrene rubber (MBS) shell-core polymer, commercially available from the Rohm and Haas Company under the trade names ACRYLOID ® and PARALOID ®, is useful in the subject invention. ACRYLOID KM680 and PARALOID XL3691, used commercially to modify polyvinyl chloride (PVC), are particularly useful in the subject invention.

The optional, third polymeric component of the blends of the invention, present as a minor component if present at all, is an acidic polymer containing moieties of an α-olefin and an α,β-ethylenically unsaturated carboxylic acid, optionally polymerized with a third monomer and optionally having a portion of the carboxylic acid groups neutralized with non-alkali metal. The α-olefin monomer of this optional blend component is an α-olefin of up to 10 carbon atoms inclusive such as ethylene, propylene, 1-butene, isobutylene, 1-octene and 1-decane. Preferred α-olefins are straight chain α-olefins of up to 4 carbon atoms inclusive and most preferred is ethylene. The α-olefin monomer of this optional blend component is present in at least 65 mol % based on total component and is preferably present in at least 80 mol % on the same basis.

The ethylenically unsaturated carboxylic acid monomer is an α,β-ethylenically unsaturated carboxylic acid of up to 10 carbon atoms inclusive and is illustrated by acrylic acid, 2-hexenoic acid and 2-octenoic acid. The preferred α,β-ethylenically unsaturated carboxylic acids have up to 4 carbon atoms inclusive. These acids are acrylic acid, methacrylic acid and crotonic acid, of which acrylic acid and methacrylic acid are particularly preferred. The unsaturated acid monomer of the optional fourth polymeric blend component is present in an amount from about 1 wt % to about 35 wt % based on total blend component, but amounts from about 5 mol % to about 20 mol % on the same basis are preferred.

The acidic polymeric optional blend component is suitably a copolymer of the α-olefin and the unsaturated carboxylic acid and in general such copolymers are preferred. On occasion, however, it is useful to incorporate as an optional third monomer a non-acidic, low molecular weight polymerizable monomer of up to 8 carbon atoms inclusive. Such optional monomer may be another α-olefin such as propylene or styrene when the major α-olefin monomer is ethylene, an unsaturated ester such as vinyl acetate, methyl acrylate or ethyl methacrylate, an unsaturated halohydrocarbon such as vinyl fluoride or vinyl chloride, or an unsaturated nitrile such as acrylonitrile. As previously stated, the presence of this third monomer is optional and is not required. Amounts of the third monomer up to about 5 mol %, based on total optional blend component polymer are satisfactory with amounts up to about 3 mol % on the same basis being preferred.

Independent of whether the polymer of the optional third blend component is a copolymer or a terpolymer, in an optional embodiment of the third polymeric blend component a portion of the carboxylic acid groups is neutralized with non-alkali metal. When partially neutralized, this optional blend component is polymeric in form while exhibiting ionic character and is conventionally referred to as a metal ionomer. In the partially neutralized embodiment of the optional polymeric blend component the α-olefin/unsaturated carboxylic acid polymer, with or without the optional third monomer, is reacted with a source of ionizable zinc, aluminum or magnesium compound sufficient to neutralize from about 10% to about 90%, preferably from about 20% to about 80%, of the carboxylic acid groups present in the polymer. Such neutralization, particularly with zinc, the preferred metal, results in a uniform distribution of metal throughout the polymer. The ionizable metal compound utilized in the neutralization is a source of complexed or uncomplexed non-alkali metal ions including zinc, aluminum or magnesium ions which are provided in compounds of the type known as metal salts, e.g., uncomplexed metal ion salts such as zinc acetate, zinc chloride or zinc formate, or complexed metal ion salts in which the metal is bonded to two types of groups, at least one of which is readily ionizable and the other is not. Illustrative of such complexed metal ion salts are mixed zinc salts with one weak acid such as oleic acid or stearic acid and one more ionizable acid such as acetic acid or formic acid. In general, neutralization with a complexed non-alkali metal ion is preferred.

The optionally partially neutralized polymers employed as the optional polymeric blend component are broadly conventional and many are commercial. Copolymers of ethylene and methacrylic acid are marketed by DuPont under the trademark NUCREL® and copolymers of ethylene and acrylic acid are marketed by Dow under the trademark PRIMACORE®. Partially neutralized polymers are marketed by DuPont under the trademark SURLYN®.

The amount of the optional third component will suitably be up to about 10 wt % based on the total polymer blend. Amounts of the optional blend component up to about 5 wt % on the same basis are preferred.

The blends of the invention may also include conventional additives such as antioxidants and stabilizers, fillers and fire resistant materials, mold release agents, colorants and other materials designed to improve the processability of the polymers or the properties of the resulting blend. Such additives are added by conventional methods prior to, together with, or subsequent to, the blending of the polyketone and the other blend component(s).

The method of producing the blends of the invention is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear. The blends are processed by conventional methods such as extrusion and injection molding into sheets, films, plates and shaped parts. Illustrative of such applications are the production of internal and external parts for automotive use.

The invention is further illustrated by the following Examples which should not be regarded as limiting.

EXAMPLE 1

Two linear alternating terpolymers of carbon monoxide, ethylene, and propylene were produced in the presence of a catalyst composition formed from palladium acetate, trifluoroacetic acid and 1,3-bis[di(2-methoxyphenyl)phosphino]propane. The polyketone polymers had melting points of about 220° C. and limiting viscosity numbers of about 1.7 dl/g when measured in m-cresol at 60° C. The polyketone polymers all contained 1 pph of NUCREL® 535, a commercially available copolymer of ethylene and methacrylic acid.

EXAMPLE 2

Blends were prepared of a polyketone terpolymer of Example 1 and ACRYLOID KM680, a polymethylmethacrylate/butadiene-styrene (MBS) shell-core modifier obtained from Rohm & Haas. This modifier can be referred to as a two stage latex, where the rubber core is cross-linked and the polymethylmethacrylate (PMMA) shell is lightly grafted to the rubber core. The particle size of the ACRYLOID KM680 is small, about 0.18 micron, spherical, and very uniform. The blends prepared are shown in Table 1.

The blends were compounded on a Haake 30 mm co-rotating twin screw extruder, operating at 200 RPM with melt temperatures between 260° C. and 270° C. Subsequent to blending, specimens of the blends were injection molded on a 25 ton Arburg molding machine at 260° C. Molded specimens were stored over desiccant until tested. Mechanical testing was performed on "dry as molded" specimens.

TABLE 1

| Composition (Polyketone/ ACRYLOID) | Impact and Tensile Properties | | | | | |
|---|---|---|---|---|---|---|
| | Notched Izod (ft-lb/in) | | Gardner (in-lb) | Tensile Modulus | Yield Stress | Elong. |
| | −29° C. | +23° C. | −30° C. | (kpsi) | (psi) | (%) |
| 100/0 | 1.2 | 5.9 | 250 | 200 | 8430 | 300 |
| 90/10 | 1.7 | 5.8 | 50 | 235 | 8010 | 160 |
| 80/20 | 2.0 | 15.9 | 70 | 198 | 7150 | 330 |

Impact and tensile properties of the samples are shown in Table 1. Modulus is the tensile secant modulus measured at 1% strain; Yield Stress is the tensile stress at yield; and Elongation is tensile strain at break. The data indicate that ACRYLOID KM680 is an effective toughener for the polyketone polymer.

Notched Izod values of the polyketone polymer at both 23° C. and −29° C. increased significantly with 20 wt % ACRYLOID KM680. Gardner impact values were not improved, but were comparable to values obtained when other impact modifiers are used.

Also of interest was the increase in tensile modulus obtained for the ACRYLOID KM680 blends, compared with the neat polyketone polymer. Generally, the addition of a rubber impact modifier will reduce the modulus of polyketone blend. However, addition of 10 wt % ACRYLOID KM680 increased the tensile modulus of the polyketone polymer. The hard PMMA shell may be acting to offset a reduction in tensile modulus, while the butadiene-styrene rubber core provides toughness.

Tensile yield stress also tended to decrease upon rubber modification, as demonstrated in Table 1. Ultimate tensile elongation, also shown in Table 1, was slightly improved with 20 wt % ACRYLOID KM680.

Scanning transmissions electron microscopy (STEM) was performed on a thin section microtomed from a molded tensile bar containing 10 wt % ACRYLOID KM680 modifier and stained with $RuO_4$ vapor. The ACRYLOID modifier exhibited a spherical, particulate morphology. The fact that the rubber core is cross-linked, and that the PMMA shell has some grafting to the rubber core, prevented the particles from dissolving or deforming within the matrix polyketone during melt processing. Although a uniform primary particle size was maintained, some aggregation of these primary particles within the polyketone matrix was observed in the STEM micrograph.

EXAMPLE 3

Blends were prepared of the polyketone terpolymers of Example 1 and PARALOID XL3691, available from Rohm & Haas. Like ACRYLOID, PARALOID XL3691 is an MBS shell-core modifier. This PARALOID modifier has a particle size of about 0.2 micron. The blends prepared are shown in Table 2.

The blends were compounded on a Haake 30 mm co-rotating twin screw extruder, operating at 200 RPM, with melt temperatures between 260° and 280° C. Subsequent to blending, specimens of the blends were injection molded on a 25 ton Arburg molding machine. Molded specimens were stored over desiccant until tested. Mechanical testing was performed on "dry as molded" specimens.

TABLE 2

| Composition (Polyketone/ ACRYLOID) | Notched Izod (ft-lb/in) | | Gardner (in-lb) −30° C. | Tensile Modulus (kpsi) | Yield Stress (psi) | Elong. (%) |
|---|---|---|---|---|---|---|
| | −29° C. | +23° C. | | | | |
| 100/0 | 1.2 | 5.7 | 250 | 200 | 8430 | 300 |
| 90/10 | 2.5 | 12.2 | 90 | 218 | 7640 | 211 |
| 80/20 | 2.8 | 22.6 | 100 | 202 | 6650 | 396 |
| 70/30 | 3.3 | 24.0 | 140 | 152 | 5410 | 309 |

Impact and tensile properties of the samples are shown in Table 2. The data indicate that PARALOID XL3691 is an effective toughener for the polyketone polymer.

At ambient temperatures, Notched Izod values increased steadily with modifier content, reaching a value of 24 ft-lb/in with 30 wt % PARALOID XL3691. Notched Izod values also increased at low temperature, reaching a value of 3.3 ft-lb/in. Addition of PARALOID XL3691 significantly improved the Notched Izod performance of the polyketone matrix polymer.

Although the PARALOID modifier did not improve the Gardner impact of the polyketone polymer, the values for the blends increased steadily with modifier content after the initial drop at low modifier concentration. This may indicate some intrinsic toughening is occurring, which may be enhanced with suitable control of blend morphology.

The PARALOID modifier is primarily elastomeric, with an elastic modulus considerably less than that of the neat polyketone polymer. Therefore, blending to produce a toughened material invariably involves a compromise on stiffness and strength of the blend. PARALOID, having a stiff outer shell, provides less of a reduction in tensile modulus than pure elastomeric modifiers. A significant drop in tensile modulus occurred only at a relatively high loading of 30 wt % PARALOID XL3691. Tensile yield stress also tended to decrease upon modifier addition, but elongation was, for the most part, undiminished upon blending.

A STEM micrograph was also obtained for a thin section microtomed from a molded tensile bar containing 10 wt % PARALOID XL3691 modifier. The STEM micrograph indicated that an optimum dispersion was not obtained. The PARALOID modifier, with a particle size of about 0.2 micron, was found in aggregates of up to 1 micron, containing as many as ten or more individual particles. A more uniform dispersion of individual particles would provide optimum properties. Nevertheless, the observed aggregates were sufficiently small to be effective in the blends.

What is claimed is:

1. A polymer blend composition comprising:
   (1) from about 60 wt % to about 90 wt %, based on total blend, of a linear alternating polymer of carbon monoxide and at least one ethylenically unsaturated hydrocarbon;
   (2) from about 10 wt % to about 30 wt %, based on total blend, of an acrylic shell-core modifier, comprising:
      (a) about 50 to 90 wt % of a first elastomeric phase having a glass transition temperature of less than about 25° C., and
      (b) about 10 to 50 wt % of a final rigid phase, having a glass transition temperature of greater than about 50° C. and polymerized from monomers selected from the group consisting of alkyl methacrylates, styrenes, acrylonitrile, methacrylonitrile, and olefins; and
   (3) up to about 10 wt %, based on total blend, of an acidic polymer incorporating moieties of α-olefin, α,β-ethylenically unsaturated carboxylic acid and optionally a non-acidic, low molecular weight polymerizable monomer, the acidic polymer optionally having a portion of the carboxylic acid groups neutralized with non-alkali metal.

2. The composition of claim 1 wherein the linear alternating polymer is represented by the repeating formula

where G is a moiety of an ethylenically unsaturated hydrocarbon of at least 3 carbon atoms polymerized through the ethylenic unsaturation and the ratio of y:x is no more than about 0.5.

3. The composition of claim 2 wherein the elastomeric phase of the acrylic shell-core modifier is an interpolymer polymerized from 50 to 99.9 wt % monomers selected from the group consisting of alkyl acrylates, wherein the alkyl group contains 1 to 15 carbon atoms, and butadiene or substituted butadiene; 0 to 40 wt % of other ethylenically unsaturated monomers; 0 to 5 wt % of at least one polyunsaturated crosslinking monomer; and 0 to 5 wt % of a graft-linking monomer.

4. The composition of claim 3 wherein the final rigid phase of the acrylic shell-core modifier additionally comprises 0 to 49 wt % of one or more acrylic comonomers selected from the group consisting of alkyl and aryl methacrylates, alkyl and aryl acrylates, and substituted alkyl and aryl methacrylates; and 0 to 40 wt % of another copolymerizable ethylenically unsaturated monomer.

5. The composition of claim 4 wherein the acrylic shell-core modifier has a particle size of 0.05 micron to 0.3 micron.

6. The composition of claim 5 wherein the elastomeric phase of the acrylic shell-core modifier comprises 50 to 90 wt % alkyl acrylate monomers, wherein the alkyl group preferably contains 1 to 8 carbon atoms; 0 to 20 wt % other acrylic monomers; 5 to 20 wt % other ethylenically unsaturated monomers; 0.1 to 1.0 wt % of polyethylenically unsaturated crosslinking monomer; and 0.1 to 1.0 wt % of graft-linking monomer.

7. The composition of claim 6 wherein the final rigid phase comprises homopolymers or copolymers of alkyl methacrylates wherein the alkyl group contains 1 to 15 carbon atoms.

8. The composition of claim 2 wherein, in the linear alternating polymer, G is a moiety of propylene and the ratio of y:x is from about 0.01 to about 0.1.

9. The composition of claim 8 wherein the linear alternating polymer comprises from about 75 wt % to about 85 wt % of the total blend, and the acrylic shell-core modifier comprises from about 15 wt % to about 25 wt % of the total blend.

10. The composition of claim 9 wherein the acidic polymer is present, and comprises a non-neutralized copolymer of ethylene and acrylic acid or methacrylic acid.

11. The composition of claim 9 wherein the acidic polymer is present, and has from about 10% to about 90% of the carboxylic acid groups neutralized with zinc, aluminum or magnesium.

12. The composition of claim 2 wherein, in the linear alternating polymer, y is zero.

13. A polymer blend composition comprising:
   (1) from about 60 wt % to about 90 wt %, based on total blend, of a linear alternating polymer of carbon monoxide and at least one ethylenically unsaturated hydrocarbon, wherein the linear alternating polymer is represented by the repeating formula

wherein G is a moiety of an ethylenically unsaturated hydrocarbon of at least 3 carbon atoms polymerized through the ethylenic unsaturation and the ratio of y:x is no more than about 0.5;
   (2) from about 10 wt % to about 30 wt %, based on total blend, of an acrylic shell-core modifier, wherein the acrylic shell-core modifier comprises an elastomeric phase polymerized from monomers comprising butadiene or substituted butadiene, and a final rigid phase polymerized from monomers comprising an alkyl methacrylate; and
   (3) up to about 10 wt %, based on total blend, of an acidic polymer incorporating moieties of $\alpha$-olefin, $\alpha,\beta$-ethylenically unsaturated carboxylic acid and optionally a non-acidic, low molecular weight polymerizable monomer, the acidic polymer optionally having a portion of the carboxylic acid groups neutralized with non-alkali metal.

14. The composition of claim 13 wherein the alkyl methacrylate of the final rigid phase is methylacrylate.

15. The composition of claim 13 wherein the acrylic shell-core modifier has a particle size of 0.05 micron to 0.3 micron.

16. The composition of claim 15 wherein, in the linear alternating polymer, G is a moiety of propylene and the ratio of y:x is from about 0.01 to about 0.1.

17. The composition of claim 15 wherein the linear alternating polymer comprises from about 75 wt % to about 85 wt % of the total blend, and the acrylic shell-core modifier comprises from about 15 wt % to about 25 wt % of the total blend.

18. The composition of claim 15 wherein, in the linear alternating polymer, y is zero.

19. The composition of claim 13 wherein the acidic polymer is present, and comprises a non-neutralized copolymer of ethylene and acrylic acid or methacrylic acid.

20. The composition of claim 13 wherein the acidic polymer is present, and has from about 10% to about 90% of the carboxylic acid groups neutralized with zinc, aluminum or magnesium.

* * * * *